(No Model.)  4 Sheets—Sheet 1.

M. P. FARNHAM.
COMBINED HARVESTER AND THRASHER.

No. 378,581.  Patented Feb. 28, 1888.

Witnesses,
Geo. H. Strong.
J. A. Rowse.

Inventor,
M. P. Farnham,
By Dewey & Co.
att'ys (No Model.)  4 Sheets—Sheet 2.

M. P. FARNHAM.
COMBINED HARVESTER AND THRASHER.

No. 378,581.  Patented Feb. 28, 1888.

Witnesses,
Geo. H. Strong.
J. H. Kruse.

Inventor,
M. P. Farnham.
By Dewey & Co.
Atty (No Model.) 4 Sheets—Sheet 3.
M. P. FARNHAM.
COMBINED HARVESTER AND THRASHER.

No. 378,581. Patented Feb. 28, 1888.

Witnesses,
Geo. H. Strong.
B. Morse.

Inventor,
M. P. Farnham.
By
Dewey & Co.
attys (No Model.) 4 Sheets—Sheet 4.
M. P. FARNHAM.
COMBINED HARVESTER AND THRASHER.

No. 378,581. Patented Feb. 28, 1888.

Witnesses,
Geo. H. Strong.
J. H. Nourse.

Inventor,
M. P. Farnham.
By Dewey & Co
attys

UNITED STATES PATENT OFFICE.

MOSES P. FARNHAM, OF GERMANTOWN, CALIFORNIA.

COMBINED HARVESTER AND THRASHER.

SPECIFICATION forming part of Letters Patent No. 378,581, dated February 28, 1888.

Application filed July 26, 1886. Serial No. 209,169. (No model.)

*To all whom it may concern:*

Be it known that I, MOSES P. FARNHAM, of Germantown, Colusa county, State of California, have invented an Improvement in a Combined Harvester and Thrasher, of which the following is a specification.

My invention relates to an apparatus for thrashing grain; and it consists in the construction and combination of devices, which I shall hereinafter fully describe and claim.

Figure 1:
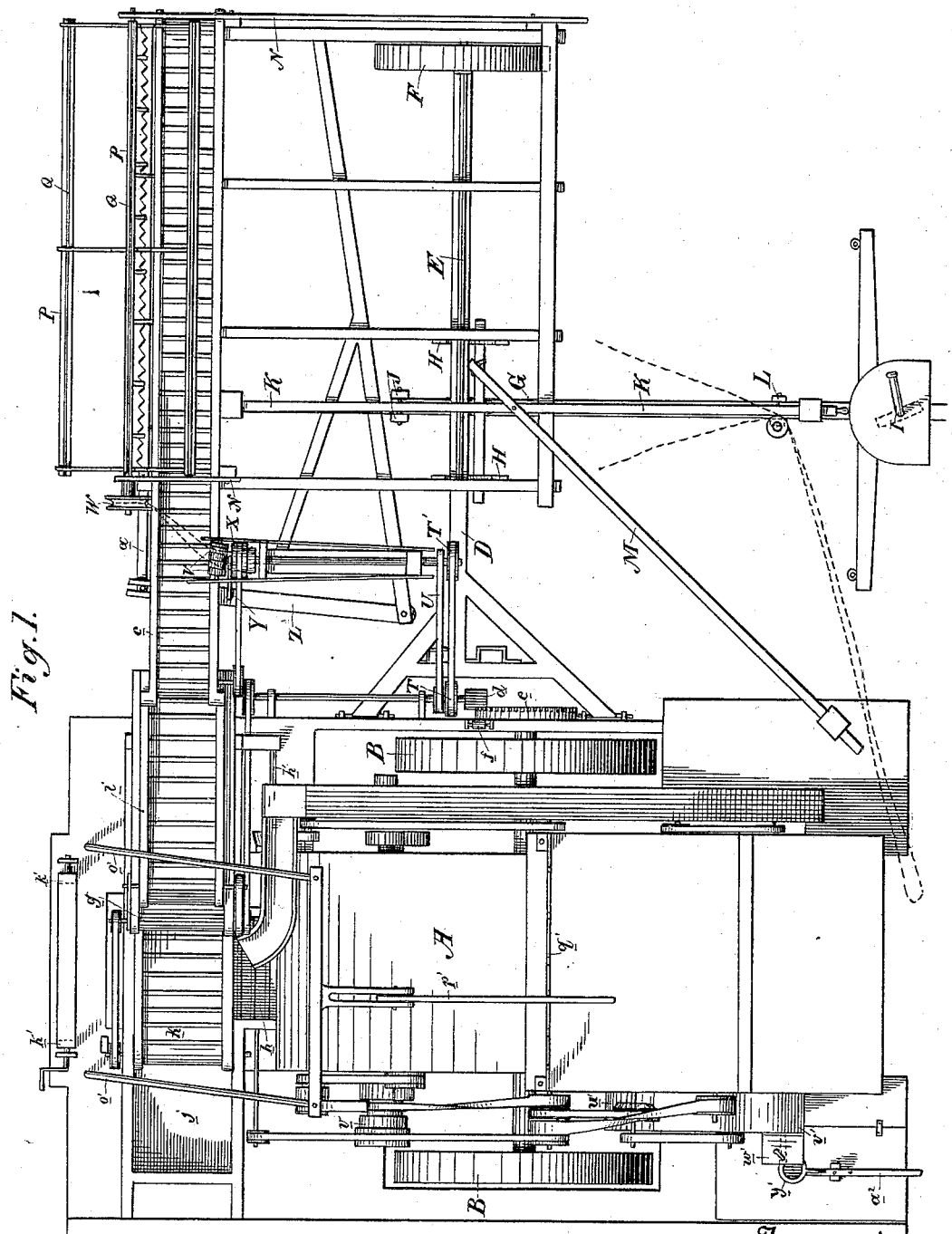
Figure 2:
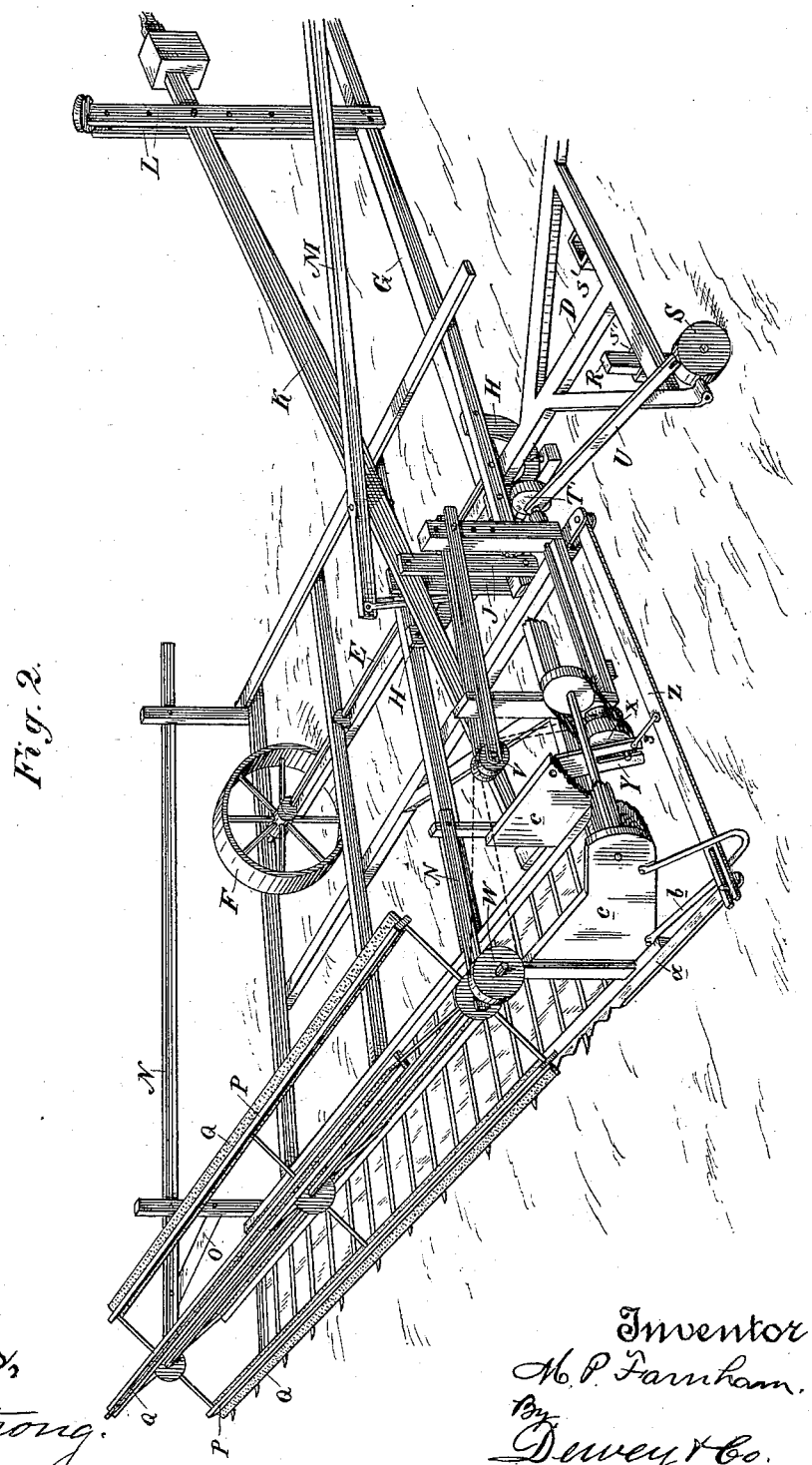
Figure 3:
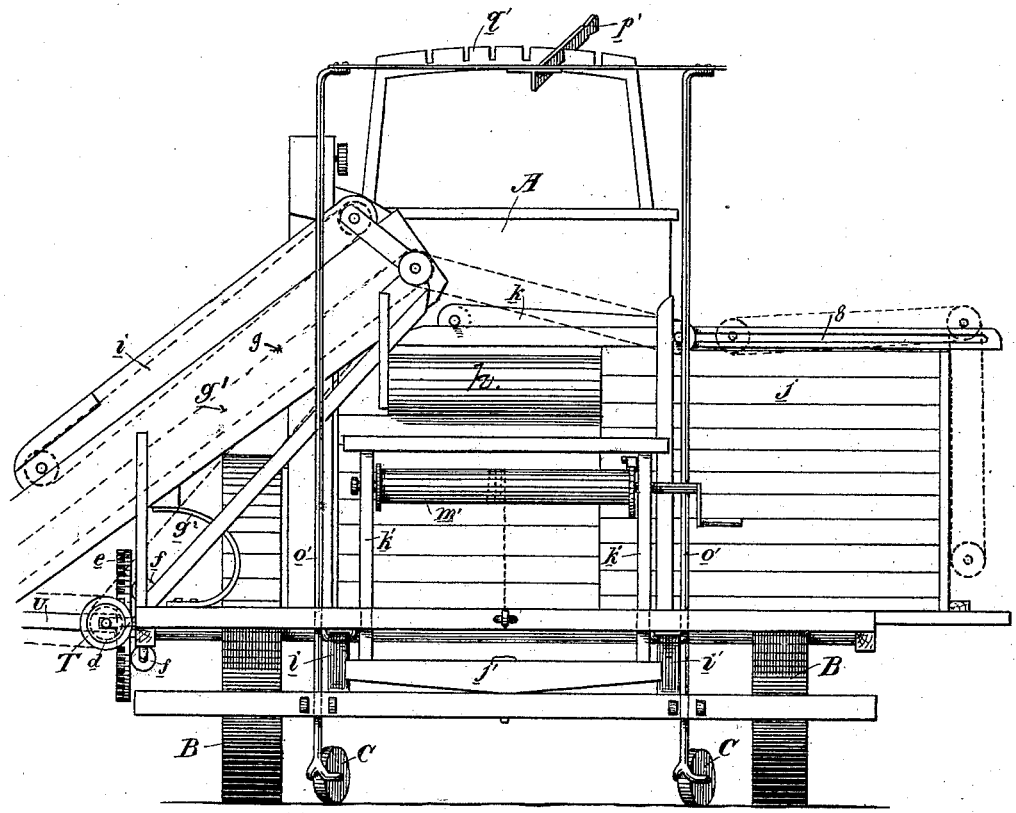
Figure 4:
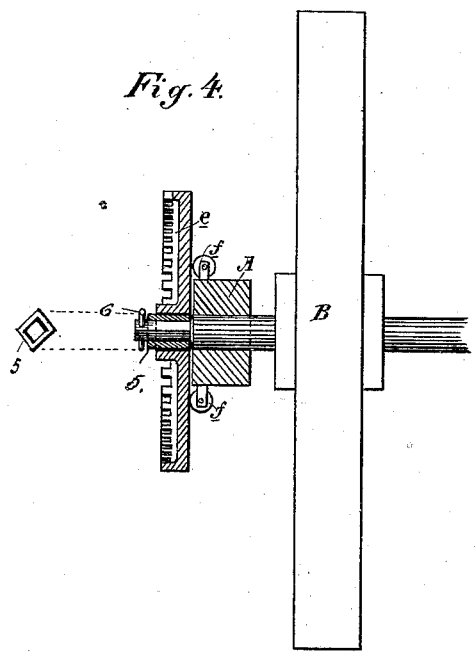
Figure 5:
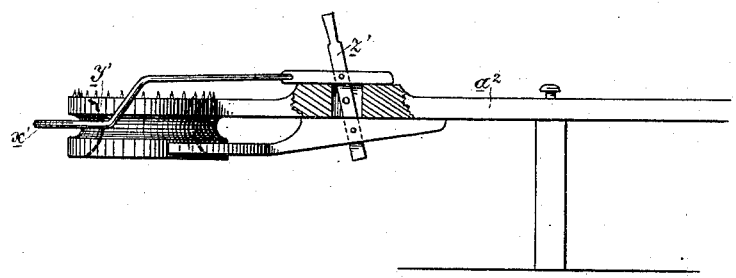
Figure 6:
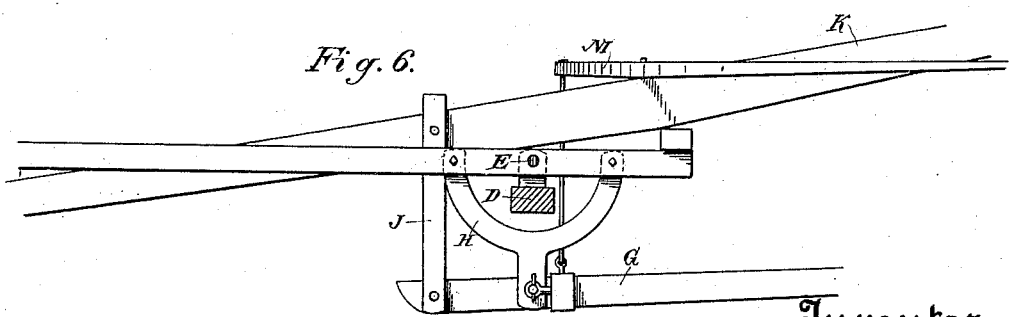

Figure 1 is a plan view of my combined header and thrasher. Fig. 2 is a perspective view of the header portion detached. Fig. 3 is a front view of the thrasher, showing the elevator-spout and the steering apparatus. Fig. 4 is an enlarged view of the loose driving attachment of the crown-wheel $e$. Fig. 5 is a side elevation of the bag-holder. Fig. 6 illustrates the lever mechanism for elevating the front of the frame.

A is a thrashing-machine exterior casing, which is mounted upon wheels B for convenient transportation, and has steering or caster wheels C, which support the front end and which serve to guide the apparatus when it is moved about the field, as will be more fully described hereinafter.

This thrashing-machine may be drawn independently or without the header, when desired, to any point where it is to remain stationary while thrashing, and driven by means of a belt from an engine or other driving-power, and it may, however, be used in connection with a header or cutting apparatus, which I will first proceed to describe. This header is hinged to the side of the thrashing-machine by means of a coupling-bar, D, having suitable braces, this bar extending outward at right angles from the thrasher and having the frame of the header connected with it.

The header-frame is made of timbers of any suitable construction properly braced to prevent torsional strain, as shown. The bar D, which is hinged to the thrasher-frame, extends across the rear portion of the header-frame, the other timbers of which are secured, preferably, above it, extending forward at right angles from it and supporting the cutter-bar or sickle and the reel-frame. Above the bar D is a shaft, E, upon the outer end of which is a bearing-wheel, F, which supports the outer end of the header-frame. The pole G, to which the team is attached to drive the header-frame, is hinged or journaled in brackets H, (see Fig. 6,) which depend from the header-frame just beneath the timber D. The rear end of the pole is supported upon a trailing wheel, I, and from the front end, which extends beyond the coupling-bar D, a standard, J, rises, and the lever K is fulcrumed in it. The front end of the lever K is secured to the transverse timbers of the horizontal carrying-belt frame. The rear end of the lever passes between the two sides of a double guide-standard, L, and is suitably weighted, so that it can be easily moved by an operator standing on the platform at the rear of the pole.

M is a lever by which the header-frame is moved so as to raise or lower the sickle. This lever is fulcrumed upon the top of the lever K, and its short arm is connected by a link with the tongue or pole G near the point where it is hinged to the frame, so that by pressing down upon the lever M the front of the frame may be raised to any desired degree. A weight-box is fixed to the rear end of the pole, into which a sufficient amount of weight may be placed as a counter-balance. The action of this pole hinged to the frame below the line of the shaft will assist to raise the spout and the front of the header and the sickle-bar whenever a strong resistance is made, as with very heavy grain, and when the resistance becomes lighter, there being a constant pressure on the short pendent arms, which may be raised by making several holes, so as to couple higher or lower, it will again drop, allowing the sickle to cut lower.

The reel is supported by the arms N, which extend to the front above the sickle, the reel-shaft being journaled in these arms. In order to prevent unnecessary vibration, which is liable to take place in these arms, I employ a brace, O, which extends from the vertical post to the right reel-arm, thus holding it and preventing vibration or oscillation. The other arm is supported by a post upon the short stationary spout, and the reel is raised or lowered by moving the fastening-bolts in slots in the posts. The reel itself is made with radial arms P, extending from end to end and slotted, so as to receive strips of rubber or other elastic material, Q, which project slightly beyond the bars and very materially assist in sweeping the small heads of grain toward the sickle, so that they will be properly cut and swept onto the draper.

The header-frame is separable from the thrasher-frame by withdrawing the hinge-pins, and when thus separated the small standard R, with the wheels S at its lower end, is fitted into a socket, S', on the inner end of the bar D, thus supporting this end of the header, while the outer end is supported upon the wheel F, and the header may then be driven with its team independent of the thrasher. Another peculiarity of this mechanism is the driving of the header mechanism directly from the thrashing-machine. This is accomplished by means of a belt extending between the pulleys T (the shaft of which is journaled to the thrashing-machine) and the pulley T', the shaft of which is journaled in the header-frame, as shown. The belt extending between these pulleys must have considerable tension, and in order to keep the pulleys the proper distance apart and prevent their being drawn toward each other, so as to loosen this belt, I employ a brace, U, which extends from one shaft to the other, and thus prevents their drawing toward each other.

The shaft of the pulley T' on the header-frame has fixed to it a pulley, and a belt passing over this pulley and the direction-pulleys V is led to the pulley W on the reel-shaft, so that this is driven as desired. A crank-wheel or disk, X, is also fixed upon the shaft of the pulley T', and has a pin projecting from its face which enters a slot in a lever-arm, Y. The upper end of this lever is fulcrumed to any suitable part of the header-frame, so that the lower end is free to oscillate from side to side about this fulcrum by the action of the crank-pin moving in the slot.

From the lower end of the lever-arm Y a pitman, 3, extends to a vibrator, Z, the rear end of which is pivoted to the rear portion of the header-frame, while the front end is connected with the end of the sickle $a$. By this construction the sickle-bar has a considerable throw and is operated very economically. In order to prevent the bar being bent upward or downward by this movement, I employ guides $b$, between which the end projecting beyond the guards and frame moves, and is thus prevented from bending.

The usual horizontal carrying-belt or draper passes around drums or rollers at each end of the front of the header-frame and just behind the sickle, being driven from the pulley-shaft, before described, and this belt extends upward in the fixed or stationary short inclined spout $c$, thus elevating the grain a short distance to a point where it may be readily delivered into the hinged spout upon the thrashing-machine itself. This leaves the header with a comparatively small weight at one side, and it is thus easily detached and moved independently from the thrashing-machine whenever desired. By reason of the shaft E and the wheel F being situated at the rear of the header-frame the movement of the front of the frame about this shaft as a fulcrum is considerable, and the sickle may thus be raised or depressed as much as is desired for different heights of grain.

The shaft upon which the pulley T is secured extends along the side of the thrasher-frame in the direction of the line of travel and at right angles with the bearing-wheel axle. Upon the end of this shaft is a pinion, $d$, and this is engaged and driven by a crown-wheel, $e$, upon the axle of the main bearing-wheel B of the thrashing-machine. In order to allow this wheel proper motion upon its shaft, so that it will not bind or cramp with the pinion or may not be thrown out of gear altogether, it is fixed loosely upon the wheel-axle by means of a square socket which is made in the hub of the wheel, and fits upon the square sleeve 5, of iron, which fills the space between the square socket and the square end of the axle. A pin, 6, passes through the outside, so as to prevent its slipping off the axle; but no strain comes upon the pin by reason of the irregular movements of the wheel, and at the same time it is caused to properly rotate on account of the square socket. Behind the rim of the wheel at the point where it engages the pinion or trundle $d$ are fixed two rollers or anti-friction wheels, $f$, one above and the other below the horizontal plane of the pinion $d$, these wheels $f$ being journaled upon the sides of the thrashing-machine frame, so that the back of the rim of the gear-wheel $e$ travels in contact with them, and it is thus kept constantly in gear with the pinion.

The spout $g'$ of the carrying-belt or draper, which is attached to the thrashing-machine, has its upper end journaled above the horizontal feeder-belt $h$, so that its contents may be deposited upon this belt and by it carried to the thrashing-cylinder. The lower end of this spout is supported by a stiff spring, $g^2$, which always keeps it in contact with the stationary spout of the header.

Above the draper $g$ is a secondary or supplemental belt-frame, $i$, (see Fig. 1,) having a belt passing around pulleys at each end lying parallel with and above the belt or draper in the spout $g$. This upper belt is driven by a short belt from the pulley which drives the draper in the spout $g$, and this pulley again is driven from a pulley upon the end of the shaft carrying the pinion $d$, which is driven from the main wheel-axle. The action of this upper belt is to hold the straw in place as it passes up the incline spout, preventing its being blown or carried out of the spout and insuring its proper delivery.

On the upper end, upon the opposite side of the thrashing-machine from the draper-spout, is a box or receptacle, $j$, which is intended to receive any surplus grain when starting after any stoppage until the thrasher gets full speed, or when the feed is very heavy, so as to prevent the cylinder from being choked, or when the grain is extremely light and it is desirable to cut a considerable quantity without running the thrashing machinery, the thrashing machinery may be thrown out of gear and the grain may be discharged into this box until it is full, when it can be fed to the cylinder and thrashed in a short time. Whenever it is desired to deliver the grain into this box instead of upon the feeder-belt *h*, it is done by means of a short belt, *k*, passing around drums at each end of a supporting-frame, this belt being driven by means of a pulley upon the end of the roller-shafts and a belt from the shaft at the upper end of the inclined draper. The shaft upon which this driving-belt pulley of the short draper *k* is fixed extends outside of the frame-work and passes through horizontal slots or guides 8 in the top of the box *j*. This shaft serves as a fulcrum about which the short carrying-belt may be turned, so that one end either stands directly beneath the upper end of the inclined spout which delivers grain from the header or it may be thrown over so as to rest across the top of the box *j*. When it stands beneath the end of the header-spout, it covers the feeder-belt *h* and receives all grain and straw from the header-spout, delivering it into the box *j*. When it is thrown over so as to lie across the box, it allows the grain to fall upon the feeder-belt, as before described. If it is desired to move this belt entirely away, so as to allow grain or straw to be thrown out of the box *j*, it may be released from its driving-belt on the pulley at the outer end, and its shaft may then be moved along the guides upon the top of the box until it can drop down parallel with the end of the box and entirely out of the way of the feeder for the time being. The spout upon the thrashing-machine is made wider than the stationary one, *c*, upon the header-frame, so that the latter may lie between its sides when they are traveling together.

The lower end of the spout *g'* rests upon a spring, *g²*, which is stiff enough to keep it pressed against the short spout of the header.

In order that the driver may guide the horses of the header from his position on the thrasher, so that there will be no need of a man upon the pole of the header, the reins or lines by which the horses are guided pass around the pulley upon the top of the Jacob's-staff and lead up from this to the thrasher, so that the man who raises and lowers the sickle from the top to the rear portion of the thrasher may also attend to the horses.

When the machine is all connected together, there will be no need of any steering-tiller upon the header, as the trundle-wheel is carried so far back that its vertical shaft will turn properly in its supports without attention; but when the header has been detached from the thrasher it will be necessary to attach a tiller to the top of the vertical trundle-wheel standard, so that it can be guided, and a driver would then occupy the platform at the rear of the header-frame.

The driving and bearing wheels B of the machine are mounted upon an axle which extends across beneath the thrasher, and they have pawl-and-ratchet mechanisms, by which they are connected with the axle, so as to drive it when rotated in a forward direction; but they are allowed to rotate backward when the machine is turning a corner and moved independent of each other by means of these devices.

As this machine is designed especially to be used in hilly and uneven land, it is necessary to maintain it reasonably level while at work. In order to do this, I employ a supplemental frame, *i'*, the rear end of which is hinged or connected with the main frame of the thrasher near the main driving-axle, and the front end of this frame extends beneath the front end of the thrasher-frame, as shown. Upon the front timber of this frame is mounted a bolster, *j'*, and from this bolster uprights *k'* extend upward through the front timber of the thrashing-machine frame proper. The slots or openings serve as guides, so that the front of the machine will move up and down in the proper plane. In the upper part of these uprights is journaled a shaft or drum, *m'*, having a crank or other suitable means by which it can be rotated, and a rope or chain which winds about this drum has its opposite end attached to the front of the thrashing-machine frame, so that when the rope is wound upon the drum or shaft the front of the machine will be raised above the supplemental frame *i'*, and when it is unwound the front will be correspondingly depressed. By this means I am enabled to maintain the machine nearly enough on a level and prevent irregularities of the surface from interfering with the proper action of the thrasher, carrying, and cleaning mechanism.

The front of the supplemental frame is supported upon caster or trailing wheels C, which serve to steer the machine, having vertical standards *o'*, which are bent backward and connected together by a transverse bar, as shown. From this transverse bar a jointed arm or lever, *p'*, extends backward, and when it is desired to hold the machine in a certain direction to resist the tendency to slide or move sidewise on side hills the jointed lever may be depressed, so that it will engage with a transverse rack, *q'*, which is fixed to the rear portion of the top of the thrashing-machine casing. Upon ordinary ground, however, it will not be necessary to fix the lever, as the position of the trailing or caster wheels C will be such that they will maintain themselves in a proper direction to conform to the movements of the team, which is attached to the front of the supplemental frame so as to draw the thrashing-machine, this team working independent from the one which drives the header portion of the apparatus.

In order to hold the sacks properly while receiving grain from the sacking-spout, I employ a flanged rim, $y'$, (see Fig. 5,) having points about its upper flange upon which the mouth of the sack may be attached, and a curved sliding holder, $x'$, which is operated by a lever, $z'$, serves to force this holder against the mouth of the sack and clamp it in the groove formed in the ring by which the sack is hung. This holds it firmly while being filled, and, the whole device being supported by a lever-arm, $a^2$, when the sack is full it may be lifted to one side by moving this lever, and it is shaken down by one or two movements of the lever before the sack is taken off and another one placed upon it. This makes the work of filling, shaking, and removing the sacks comparatively easy for the operator.

Having thus described my invention, what I claim as new, and desire to secure by Letters Patent, is—

1. The header-frame the rear timber of which is hinged to the side of the thrasher, extending horizontally at right angles from it, and a bearing-wheel for the outer end of the header-frame, the axle of which is journaled above the timber, in combination with the pole to which the team is attached, the front of said pole being hinged to brackets below the said timber, and having the lever K, fulcrumed in standards supported upon the front end of the pole, which extends back above the pole, substantially as herein described.

2. The header having one side hinged to the side of the thrashing machine by means of a timber extending horizontally at right angles from the thrashing-machine, a bearing-wheel by which the outer end of the header-frame is supported, the axle of said wheel being journaled above the rear timber of the header-frame, the draft-pole having its front end hinged to or connected with brackets which extend lower than the rear timber of the header-frame, while its rear end is supported by a trailing or caster wheel, and a lever having its front end connected with the front of the header-frame, its fulcrum supported upon the front end of the pole, and weighted, as shown, in combination with a lever, M, resting upon the lever K, having its long arm extending diagonally across the thrashing-machine and its short arm connected with the pole, so as to raise and lower the sickle, substantially as herein described.

3. The combination of mechanism for driving the sickle, consisting of a horizontal shaft journaled upon the side of the thrashing-machine, having a pinion which receives motion from a gear-wheel upon the main axle of the thrashing-machine, a counter-shaft upon the header-frame parallel with the first-named shaft, pulleys and belts whereby motion may be transmitted from one to the other, a crank-wheel upon the shaft on the header-frame, a slotted depending pivoted lever through which the crank-pin passes, and a pitman connected with a sway-bar which is connected to the sickle-bar, substantially as herein described.

4. The combination of the sickle reciprocating in guards at the front of the header-frame, a sway-bar having its front end connected with said sickle, its rear end permanently hinged to the rear of the header-frame, a depending pivoted vibrating slotted lever having its upper end fulcrumed or hinged upon the header-frame, its lower end connected with the sway-bar by a pitman or link, and a slot formed in this lever, within which the crank-pin of the driving-wheel may slide as the wheel revolves, substantially as herein described.

5. The header-frame having one end hinged to the side of the thrasher, the outer end supported upon a bearing-wheel about the shaft of which the header-frame is rocked for raising and lowering the sickle, and a short inclined stationary spout through which this carrier-belt passes, in combination with the hinged movable spout upon the thrasher, having a second carrier-belt upon which the grain is delivered from the primary belt and by which it is carried upward to the thrashing-machine, substantially as herein described.

6. The header-frame hinged to the side of the thrashing-machine, having a horizontal shaft parallel with the side of the thrashing-machine, a corresponding shaft journaled upon the side of the thrashing-machine, from which motion is transmitted to the header shaft by belts, as shown, and a pinion fixed to the shaft on the thrashing-machine, in combination with a crown-wheel loosely attached to the bearing shaft or axle of the thrashing-machine, so as to engage the pinion on the driving-shaft, said crown-wheel having a square socket in its hub fitted upon a similar sleeve on the squared end of the axle, and friction-rollers upon the frame, against which the rim of the crown-wheel travels and by which it is held in engagement with the pinion, substantially as herein described.

7. The header hinged to the side of the thrashing-machine, and the draper or carrying-belt extending upward a short distance from the side of the header, in combination with a spout hinged upon the side of the thrasher, extending downward, so as to receive the straw from the carrying-belt on the header, and a supplemental belt having its frame hinged to the hinged spout, so that the straw is carried up between the two belts, substantially as herein described.

8. The hinged spout with its elevating-belts by which the grain is elevated and delivered above the feeder-belt of the thrashing-machine, in combination with a supplemental belt and box to which it is hinged, whereby the grain may be received from the carrier-belts and delivered into the box instead of passing to the cylinder, substantially as herein described.

9. The box situated at the opposite side of the feeder-belt from the carrier and elevating belts and having horizontal guides or slots upon its upper edge, in combination with a frame having rollers journaled in its ends and a short carrier-belt upon which the straw from the elevator-belt may be received, said supplemental carrier having one of its rollers journaled in the slots on the top of the box, so that it may be moved from end to end thereof, substantially as herein described.

10. A device for holding the sacks, consisting of the grooved ring having points upon which the top of the sack may be hooked, and the lever-arm $a^2$, for supporting said device, in combination with the ring surrounding the grooved disk and the lever by which it may be caused to clamp the sack, substantially as herein described.

11. The grooved rings with pins and clamping ring and lever, in combination with the lever fulcrumed upon the sacker's platform and connected with the sack-holding ring, and a mechanism, comprising a lever and sliding holder, whereby the sack may be removed from the grain-spout after the grain has been settled therein, substantially as herein described.

12. The combination, with complementary driving and supply mechanisms, of the adjustable draper or carrying-belt frame hinged to the side of the thrasher, and the spring by which its lower end is supported and held in adjustment with the header-spout, substantially as herein described.

In witness whereof I have hereunto set my hand.

MOSES P. FARNHAM.

Witnesses:
S. H. NOURSE,
H. C. LEE.